United States Patent [19]

Conway

[11] Patent Number: 4,805,949
[45] Date of Patent: Feb. 21, 1989

[54] MATERIAL-HANDLING APPARATUS
[75] Inventor: Kevin Conway, Kalamazoo, Mich.
[73] Assignee: Prab Robots, Inc., Kalamazoo, Mich.
[21] Appl. No.: 93,491
[22] Filed: Oct. 19, 1987
[51] Int. Cl.[4] .................. B25J 15/10; B66C 3/04
[52] U.S. Cl. .................... 294/61; 271/18.3; 294/98; 294/107
[58] Field of Search .............. 294/61, 63.1, 67.31, 294/81.51, 81.61, 87.1, 88, 97, 98, 106–109, 115, 116, 120; 271/18.3; 414/111, 120, 721, 908; 901/31, 36–39

[56] References Cited

U.S. PATENT DOCUMENTS

| 1,295,163 | 2/1919 | Henricks | 294/61 X |
| 2,621,069 | 12/1952 | De Anguera | 294/106 |
| 2,622,915 | 12/1952 | Horn | 294/106 X |
| 2,823,947 | 2/1958 | Delzer | 294/106 X |
| 3,112,136 | 11/1963 | Hammond | 294/107 |
| 3,319,813 | 5/1967 | Beyea | 294/107 X |
| 3,427,640 | 2/1969 | Clatterbuck | 294/106 X |
| 4,316,693 | 2/1982 | Baxter et al. | 294/115 X |
| 4,607,873 | 8/1986 | Nusbaumer et al. | 294/88 |

FOREIGN PATENT DOCUMENTS

| 249698 | 2/1964 | Austria | 294/61 |
| 506881 | 10/1954 | Canada | 274/107 |

Primary Examiner—Johnny D. Cherry
Attorney, Agent, or Firm—Dressler, Goldsmith, Shore, Sutker & Milnamow, Ltd.

[57] ABSTRACT

Improved material handling device for selective pick up, holding, and release of material is disclosed. The device includes arcuate talons mounted to a first shaft capable of pivotal movement about an offset centerline and by means of talons mounted to a second shaft exhibiting pivotal movement about an offset centerline. The talons, which move in arcuate paths, pierce a plane parallel to a plane defined by the offset centerlines substantially at right angles. The talons diverge after penetrating the pierceable material.

8 Claims, 2 Drawing Sheets

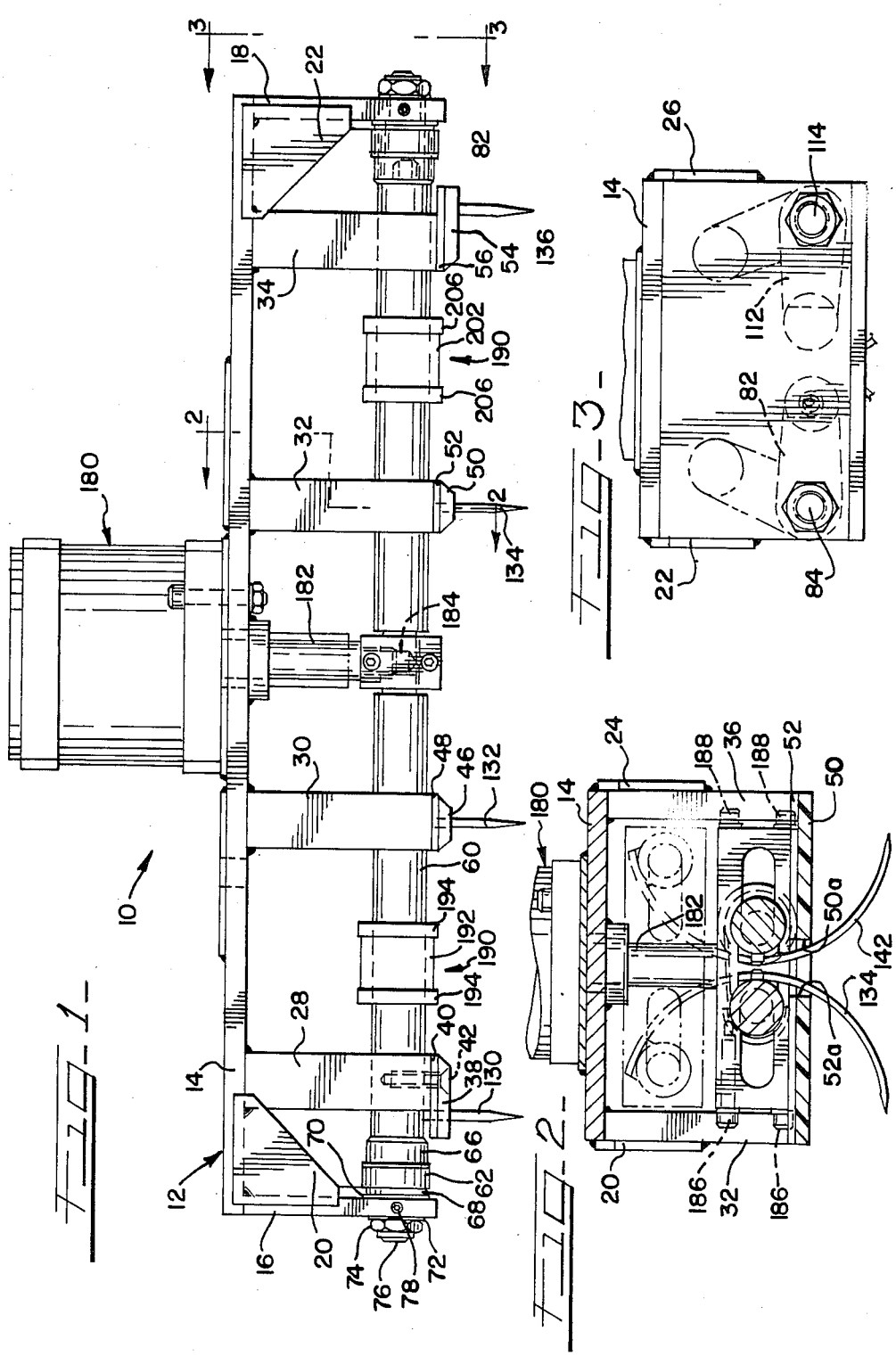

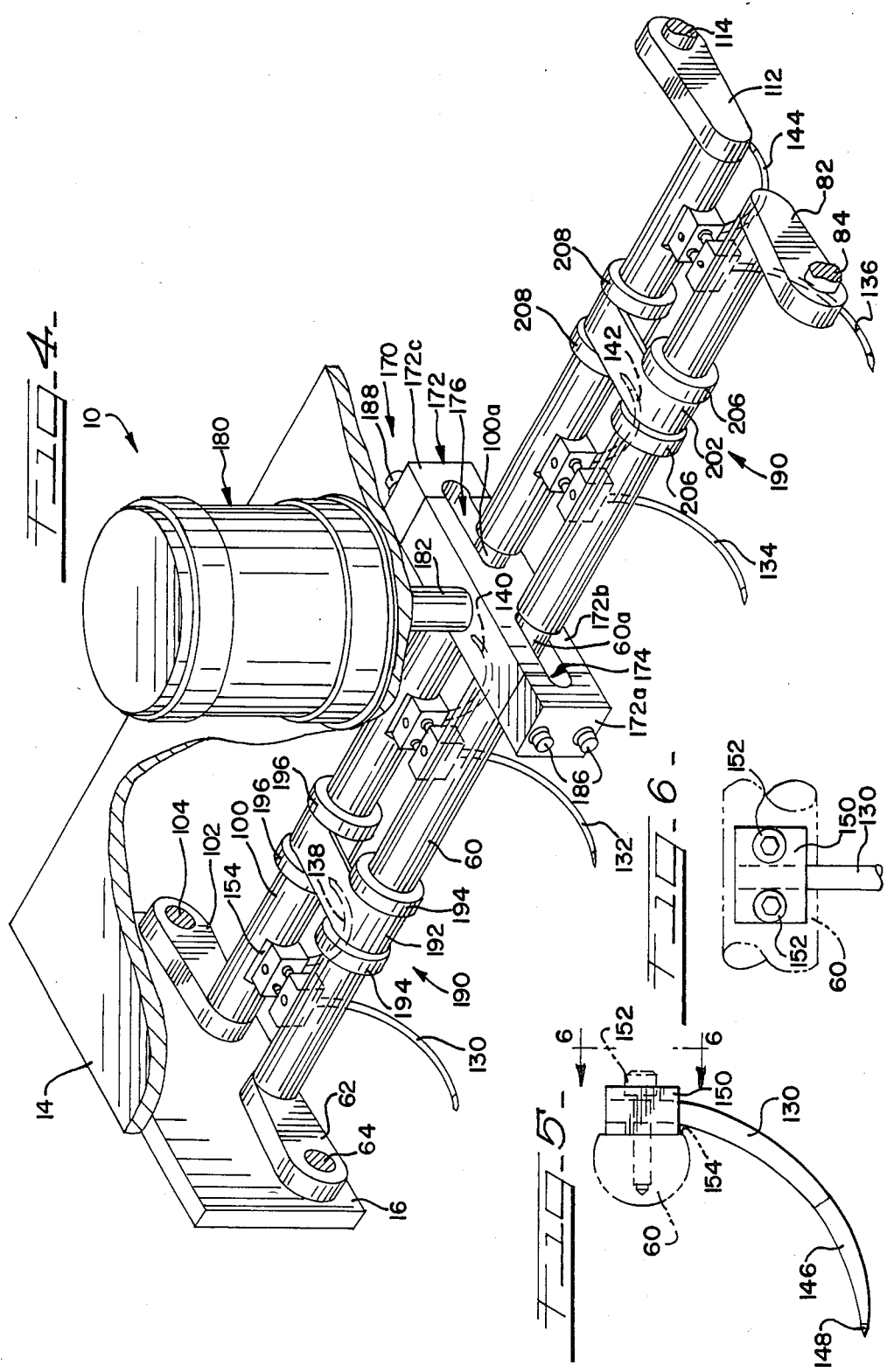

MATERIAL-HANDLING APPARATUS

FIELD OF THE INVENTION

This invention pertains to an improved handling apparatus of a type designed to pick up, hold, and release material by means of a piercing action. Such an apparatus may be advantageously used, as end-of-the-arm tooling, e.g., a gripper, on an industrial robot, to handle one or more layers of a material which may be flimsy and unsupported.

BACKGROUND OF THE INVENTION

A common feature of known apparatus of the type noted above is a set of sharpened pins, prongs, or needles, which can be selectively moved into and out of positions in which the pins, prongs, or needles penetrate a piece of material to be handled. Various mechanisms have been used to move the pins, prongs, or needles into and out of such positions. Typically, the pins, prongs, or needles move in opposed pairs, which converge as the pins, prongs, or needles are moved into such positions, and which diverge as the pins, prongs, or needles are moved out of such positions. See, e.g., U.S. Pat. Nos. 4,505,468, 4,009,786, 3,981,495, 3,386,763, and 3,240,358.

Although such known apparatus have been successfully used for textile applications and the like, some applications present special problems to which such known apparatus may not be well suited. As an example of an application presenting such problems is a sheet-molding composition (SMC) which has come into commercial use as a substitute for sheet metal for automobile panels, such as hoods, roofs, and deck lids. Such a composition is a resin-impregnated composite which includes one or more layers of fibrous non-woven sheet material, which prior to molding is not only flimsy and unsupported, so as to be easily torn when handled, but also sticky, so as to tend to cling to whatever means are used to handle such material.

Accordingly, there has heretofore been a need, to which this invention is addressed, for an improved handling apparatus of the type noted above.

SUMMARY OF THE INVENTION

This invention provides an improved handling apparatus or device well suited for handling sheet-form materials that are flimsy, unsupported, and sticky, such as the sheet molding composites noted above. Such an apparatus may be advantageously used as a gripper of an industrial robot.

Broadly, the material handling device embodies a pair of substantially parallel shafts, each pivotally mounted on the framework for rotation about an offset axis, at least one arcuate talon on each of the shafts, and a drive means for rotating the shafts so as to extend and retract the shaft-mounted talons relative to the framework.

The offset axes of rotation for the shafts are spaced from one another but are substantially parallel to one another. Each shaft is rotatable about a fixed arc in response to urging by the drive means.

Each of the shaft-mounted talons extends from its respective shaft in a plane that is substantially normal to the axis of rotation. The radius of curvature of each talon is substantially the same as the radius of curvature of the fixed arc for the corresponding shaft. In this manner the sheet-form material to be manipulated is subjected to a piercing action substantially normal to the general plane of the material.

The drive means is actuated by a suitable prime mover and engages the shaft so as to impart thereto a rotational motion with a resulting extension and retraction of the talons relative to he framework.

The features and advantages of this invention will be set forth in greater detail in the following description of a preferred embodiment of this invention and in accompanying drawings.

BRIEF DESCRIPTION OF THE DRAWINGS

In the drawings, FIG. 1 is an elevational view of a handling device constituting a preferred embodiment of this invention;

FIG. 2 is a cross-sectional view taken along plane 2—2 of FIG. 1 in a direction indicated by arrows.

FIG. 3 is an end view taken along plane 3—3 of FIG. 1 in a direction indicated by arrows.

FIG. 4 is a perspective view of the apparatus of FIG. 1, some elements being shown fragmentarily so as to allow other elements to be better seen.

FIG. 5 is an enlarged, elevational view showing, in full lines, a talon which is used in the apparatus of FIG. 1 and showing, in phantom lines, a shaft to which the talon is mounted and a fastener which is used to mount the talon to the shaft;

FIG. 6 is a fragmentary, elevational view taken along plane 6—6 of FIG. 5 in a direction shown by arrows.

DETAILED DESCRIPTION OF PREFERRED EMBODIMENT

As shown in the drawings, a material-handling device 10 constituting a preferred embodiment of this invention may be advantageously mounted on an industrial robot arm (not otherwise shown).

As shown in FIG. 1, device 10 includes a framework 12, which may be made of aluminum for light weight, as constituted by a rectangular top plate 14, rectangular end plates 16 and 18, each of which is welded to the top plate 14, and corner-reinforcing gussets 20, 22, 24, and 26, which are welded to the top end plates, as shown, so as to reinforce the framework 12. Specifically, the gussets 20 and 24 are welded to a front edge of the top plate 14 and to the end plate 16, and the gussets 22 and 26 are welded to a back edge of the top plate 14 and to the end plate 18. Directional terms, such as "front", "back", "up", and "down", are used herein for convenient reference to the material-handling apparatus 10, as shown in FIG. 1, but are not intended to limit the material-handling apparatus 10 to any particular orientation.

Moreover, the framework 12 comprises columnar members 28, 30, 32, and 34, which are welded to the front edge of the top plate 14 in spaced relation to one another between the end plates 16 and 18, and four columnar members (not shown except for the columnar member 36 shown in FIG. 2) which are similar to the columnar members 28, 30, 32, and 34, and which are welded to the back edge of the top plate 14 in spaced relation to one another between the end plates 16 and 18. A stripper plate 38 and a back-up plate 40 are secured to the columnar member 28 by means of a threaded fastener 42 passing through the stripper plate 38, through the back-up plate 40, and into the columnar member 28. The stripper plate 38 is secured to one of the columnar members welded to the back edge of the top plate 14 in a similar manner. A stripper plate 46 and a back-up plate 48 are secured to the columnar member 30 and to one of the columnar members welded to the back edge of the top plate 14 in a similar manner. A stripper plate 50 and a back-up plate 52 are secured to the columnar member 32 and to the columnar member 36, which is one of the columnar members welded to the rear edge of the top plate 14, in a similar manner. A stripper plate 54 and a back-up plate 56 are secured to the columnar member 34 and to one of the columnar members welded to the rear edge of the top plate 14 in a similar manner. Each of the stripper plates 38, 46, 50, and 54 and each of the back-up plates 40, 48, 52, and 56 associated with the stripper plates noted above has an aperture (not shown, except for the aperture 50a in the stripper plate 50 and the aperture 52a in the back-up plate 52, as shown in FIG. 2) which allows a talon (to be hereinafter described) to move through the aperture upwardly and downwardly in relation to the stripper and back-up plates associated with the talon. These stripper plates engage material pierced and held by the talon so as to strip the material from the talon as the talon is moved upwardly in relation to the stripper an back-up plates associated with the talon. The stripper plates 38, 46, 50, and 54 may be constructed of an inert polymeric material, such as polytetrafluroethylene, which resists build-up of residue from the material held by the talons.

Mounted on framework 12 is a first shaft 60, which has a central portion 60a of reduced diameter for a purpose to be hereinafter described. Shaft 60 is mounted to the framework 12 for pivotal movement between an upper position and a lower position (over a range of approximately 75° of an arc) about a first axis that is offset in relation to the first shaft 60. These positions are indicated in phantom in FIGS. 2 and 3. One end of a crank arm 62 is connected to one end of the first shaft 60. At the other end, the crank arm 62 is connected to the end plate 16 via a pivot pin 64 (see FIG. 4) having an enlarged head 66, extending through a bearing ring 68, through a washer 70, and through a bore (not shown) in the end plate 16. The pivot pin 64 receives a washer 72 and a nut 74, which is threaded onto a threaded end 76 of the pivot pin 64. A socket screw 78 is used to further secure the pivot pin 64 to the end wall 16. In a like manner, the crank arm 82 is connected to the other end of the first shaft 60 and to the end plate 18 via a pivot pin 84 (see FIG. 4). The axes of the pivot pins 64 and 84 are parallel to the central axis of the first shaft 60 and are coincident with the first axis described above.

A second shaft 100 is situated parallel to the first shaft 60 and has a central portion 100a of reduced diameter. Second shaft 100 is mounted to the framework 12 for pivotal movement (over a range of approximately 75° of an arc) about a second axis that is offset in relation to the second shaft 100 and between an upper position and a lower position. These positions also are indicated in phantom in FIGS. 2 and 3. The offsets for both axes are about the same.

A crank arm 102 is connected at one end fixedly to one end of the second shaft 100 and is connected at the other end to the end plate 16 via a pivot pin 104 (see FIG. 4) in a manner similar to the manner in which the crank arm 62 is connected to the end plate 16. A crank arm 112 is connected at one end to the other end of the second shaft 100 and is connected at the other end to the end plate 18 via a pivot pin 14 (see FIG. 4) in a similar manner. The axes of the pivot pins 104 and 114 are parallel to the central axis of the second shaft 100, and thus to the central axis of the first shaft 60, and are coincident with the second offset axis, which thus is parallel to the first offset axis.

As shown, the material-handling device 10 comprises eight talons, which are associated in opposed pairs of such talons with the stripper plates 38, 46, 50, and 54 respectively, as described below. However, the number of talons mounted to each shaft can vary, as desired.

One talon of each such pair is mounted to the first shaft 60. The other talon of each such pair is mounted to the second shaft 100. The talons are alike, and each has an arcuate shape extending over approximately 75° of an arc (which corresponds to the range of pivotal motion of each of the shafts 60 and 100) with a radius of curvature that is the same as the radius of curvature for the fixed arc through which the corresponding shaft pivots. Each talon has a mounting end and tapers to a point at the distal end. Also, the talons of each opposed pair move in arcuate paths, which are coplanar in relation to each other. Each talon preferably is made of stress proof steel (e.g., 1040 spring steel) which is turned, formed, heat-treated, polished, and stress-relieved. If desired, each talon may be coated with an inert polymer, e.g., polytetrafluoroethylene, to resist build-up of residue from materials pierced by such talon.

As shown in FIG. 4, talons 130, 132, 134, and 136 are associated with the stripper plates 38, 46, 50, and 54 respectively, and are mounted at the mounting ends of the respective talons to the first shaft 60, in a substantially parallel relationship to each other and in a similar manner, such that the distal ends of such talons point frontwardly when the shaft 60 is in its lower position as shown in full lines in the drawings. Similarly, talons 138, 140, 142, and 144, which also are associated with the stripper plates 38, 46, 50, and 54 respectively, are mounted at the mounting ends of the respective talons to the second shaft 100, in a substantially parallel relationship to each other and in a similar manner, such that the distal ends of such talons point backwardly when the shaft 100 is in its lower position, in which the shaft 100 is shown in full lines in the drawings.

As shown in FIGS. 5 and 6, the mounting end of the representative talon 130 is press-fitted into a bore in a block 150. In turn, the block 150 is secured to the first shaft 60, in a recess 154 formed in the first shaft 60, by means of a pair of threaded fasteners 152. Thus, if the talon should break, the talon can be easily replaced. As also shown in FIG. 5, the representative talon 130 tapers progressively to a sharpened tip at its distal end, via a transitional taper 146 and a final taper 148. The sharpened tip at the distal end of the talon 130 enables such talon easily to pierce material such as the non-woven sheet material noted above. The transitional taper 146 minimizes tearing of the material pierced by the talon 130.

Pivotal otion to the shafts 60 and 100 is imparted by drive means 170 so as to rotate each of the shafts 60 and 100 from its upper or retracted position, and in which each talon mounted thereto is in a retracted position in relation to the framework 12, to its lower or extended position, and in which each talon mounted thereto is in an extended position in relation to the framework 12.

Specifically, the drive means 170 comprises a slotted block 172 having a first slot 174, through which the first shaft 60 passes at its central portion 60a of reduced diameter, and a second slot 176, which is aligned with the first slot 174, and through which the second shaft 100 passes at its central portion 100a of reduced diameter. A pneumatically powered cylinder 180 having a linear stroke serves as a prime mover for the drive means 170. The pneumatically powered cylinder 180 is of a conventional type which may be selectively forward-actuated or reverse-actuated so as to transmit a constant force in either direction, i.e., upwardly or downwardly, as shown in FIG. 1. Preferably, the transmitted force is substantially constant. The pneumatically powered cylinder 180, which is mounted on the top plate 14, as by means of bolts (not shown), has a driving rod 182 which is connected at its lower end to the slotted block 172 via a threaded connection. When forward-actuated, the pneumatically powered cylinder 180 moves the driving rod 182 and the slotted block 172 downwardly, as shown in FIG. 1. When reverse-actuated, the pneumatically powered cylinder 180 drives the driving rod 182 and the slotted block 172 upwardly, as shown in FIG. 1.

As a manufacturing and assembling expedient, the slotted block 172 is made in three pieces, i.e., a front piece 172a, a middle piece 172b, and a back piece 172c. When the front piece 172a is separated from the middle piece 172b, the first shaft 60 is inserted, at its central portion 60a of reduced diameter, into the slot 174. When the back piece 172c is separated from the middle piece 172b, the second shaft 100 is inserted, at its central portion 100a of reduced diameter, into the slot 176. A pair of threaded fasteners 186 are used to secure the front piece 172a to the middle piece 172b. A pair of threaded fasteners 188 are used to secure the back piece 172c to the middle piece 172b. The lower end of the driving rod 182 is connected at the threaded connection noted above, to the middle piece 172b.

Preferably, each of the shafts 60 and 100 is biased to its extended position. To that end, bias means 190 is provided and comprises a constant-force (coiled-ribbon) spring 192, which is coiled at one end around the first shaft 60 and between a pair of bushings 194 mounted on the first shaft 60, which is affixed to the first shaft 60, as by means of a threaded fastener (not shown). At the other end, the spring 192 is coiled around the second shaft 100 and between a pair of bushings 196 mounted on the second shaft 100 but not affixed to the second shaft 100. A similar spring 202, which is coiled at one end of the spring 202 around the first shaft 60 and between a pair of bushings 206 mounted on the first shaft 60, is affixed to the first shaft 60, as by means of a threaded fastener (not shown). At the other end, the spring 202 is coiled around the second shaft 100 and between a pair of bushings 208 mounted on the second shaft 100 but is not affixed to the second shaft 100. The springs 192 and 202 are disposed near opposite ends of the shafts 60 and 100. Such springs are of a type which may be also called negator springs.

As mentioned above, each of the stripper plates 38, 46, 50, and 54 and each of the back-up plates 38, 48, 52, and 56 has an aperture (not shown except for the aperture 50A in the stripper plate 50 and the aperture 52A in the back-up plate 52, as shown in FIG. 2) which allows the talons associated therewith (such as the talons 134 and 142 associated with the stripper plate 50 and the back-up plate 52) to pass therethrough. Alternatively, each of the stripper plates and each of the back-up plates may be provided with separate apertures for the talons mounted to the first shaft 60 and for the talons mounted to the second shaft 100.

As shown in FIGS. 2 and 3, the shafts 60 and 100 are mounted to the framework 12, in the manner described above, such that the shafts 60 and 100 are between the first and second axes of rotation noted above when each of the shafts 60 and 100 is in its extended position. Moreover, the talons are mounted to the shafts 60 and 100 such that the distal end of each talon points in a direction substantially perpendicular to a plane defined by the first and second axes noted above at the retracted position of such talon, and such that the distal ends of the talons mounted to the first shaft 60 and the distal ends of the talons mounted to the second shaft 100 diverge as each talon approaches the extended position of such talon.

When used to pick up one or more sheets of material from a supporting table (not shown) provided with apertures or recesses to accommodate the talons, the gripper device 10 is positioned over the material, whereupon the pneumatically powered cylinder 180 is forward-actuated, which causes the slotted block 172 to be downwardly driven by means of the driving rod 182, as aided by the bias of the springs 192 and 202, which minimize binding. Thus, each of the shafts 60 and 100 is pivoted from its retracted position into its extended position (i.e., from the positions in which the shafts 60 and 100 appear in phantom in FIGS. 2 and 3 into the positions in whiqh the shafts 60 and 100 appear in full lines in the drawings) whereby the talons 130, 132, 134, and 136 mounted to the first shaft 60 and the talons 138, 140, 142, and 144 mounted to the second shaft 100 are driven from their retracted positions into their extended positions (i.e., from positions in which the talons are retracted in relation to the framework 12, as shown in phantom in FIG. 2, into positions in which the talons are extended in relation to the framework 12, as shown in full lines in the drawings). Also, each talon points in a direction substantially perpendicular to the plane defined by the first and second axes of rotation when such talon pierces the material, whereby tearing of the material is minimized. By diverging after piercing, the talons hold and support the material without bunching of the material.

It is evident, from the drawings and the preceding description, that displacement of the slotted block 172 in a downward direction, which is substantially normal to the parallel axes defined by the pivot pins 64, 84, 104, 114, moves each talon from a fully retracted position to a fully extended position and that displacement of the slotted block 172 in an opposite direction, i.e., in an upward direction, moves each talon from a fully extended position to a fully retracted position. It is evident, moreover, that the talons of each opposed pair move toward and away from each other in coplanar arcuate paths, such that the distal ends of the talons of each such pair move away from each other as such talons are being extended and move toward each other as such talons are being retracted.

When the pneumatically powered cylinder 180 is reverse-actuated, the talons are retracted so as to release the material. The stripper plates strip the material from the talons as the talons are retracted. Because each talon moves in either direction between its retracted and extended positions along the same arcuate path in relation to the framework 12, such talon does minimal damage to the material not only when the material is pierced by such talon but also when the material is stripped from such talon.

The handling device 10 may be advantageously used to pick up, hold, and release one or more layers of material, which may be flimsy and unsupported, even sticky, such as the non-woven sheet material noted above. Typically, the material is picked up at a given location, held and moved while held, and released at a different location. The handling device 10 can be modular, which entails that a number of such devices may be suitably arrayed on a robot arm, so as to handle large SCM pieces or SCM pieces having a particular configuration.

It is intended by the following claims to cover such modifications, variations, and improvements as come within the scope and spirit of this invention.

I claim:

1. A material-handling device comprising:
   a framework;
   a pair of substantially parallel shafts pivotally mounted on said framework for rotation, each in a fixed arc having a radius of curvature, about substantially parallel axes;
   at least one arcuate talon on each of said shafts and extending therefrom in a plane substantially normal to said parallel axes, each of said talons having a distal end, and each of said talons having a radius of curvature that is substantially the same as the radius of curvature of said fixed arc, the talons being mounted to the shafts in opposed pairs for movement in coplanar arcuate paths, such that the distal ends of the talons of each such pair move away from each other as the talons of said same pair are being extended relative to the framework and move toward each other as the talons of said same pair are being retracted relative to the framework; and
   drive means engaging said shafts for imparting thereto rotational motion so as to extend and retract said talons relative to said framework, the drive means comprising a slotted block having a pair of aligned slots, each slot receiving one of said shafts, and a prime mover for displacing the slotted block in one direction substantially normal to said parallel axes so as to move each talon from a fully retracted position to a fully extended position and for displacing the slotted block in an opposite direction so as to move each talon from a fully extended position to a fully retracted position.

2. The handling device of claim 1 further comprising means for biasing each shaft toward a position in which said talons are extended.

3. The handling device of claim 2 further comprising means for biasing the shafts toward one another.

4. The handling device of claim 3 wherein plural similar talons are provided on each shaft.

5. The handling device of claim 4 wherein the shafts are mounted to the framework such that the shafts are positioned between the respective axes of rotation when the talons are extended.

6. The handling device of claim 1 wherein the talons are mounted to the shafts such that the distal end of each talon points in a direction substantially perpendicular to a plane defined by said parallel axes when the talon is retracted.

7. The handling deviceof claim 6 wherein the talons are mounted to the shafts in opposed pairs for movement in coplanar arcurate paths.

8. The handling device of claim 6 wherein the talons are mounted to the shafts such that, when the talons are extended, the distal end of each talon mounted to one of said shafts points away from the distal end of each talon mounted to the other of said shafts.

* * * * *

UNITED STATES PATENT AND TRADEMARK OFFICE
CERTIFICATE OF CORRECTION

PATENT NO. : 4,805,949

DATED : February 21, 1989

INVENTOR(S) : Kevin Conway

It is certified that error appears in the above-identified patent and that said Letters Patent is hereby corrected as shown below:

Col. 4, line 58, "otion" should be -- motion --.

Col. 8, line 27, "deviceoof" should be -- device of --.

Signed and Sealed this

Nineteenth Day of December, 1989

Attest:

JEFFREY M. SAMUELS

*Attesting Officer*    *Acting Commissioner of Patents and Trademarks*